United States Patent [19]

Swiatosz et al.

[11] 4,299,579
[45] Nov. 10, 1981

[54] DEEP FAT FRYER FIRE FIGHTING SIMULATOR AND METHOD

[75] Inventors: Edmund Swiatosz, Maitland; Bruce V. Lane, Palm Bay, both of Fla.

[73] Assignee: The United States of America as represented by the Secretary of the Navy, Washington, D.C.

[21] Appl. No.: 86,978

[22] Filed: Oct. 22, 1979

[51] Int. Cl.³ .............................................. G09B 9/00
[52] U.S. Cl. .................................................... 434/226
[58] Field of Search ............................ 35/10; 434/226

[56] References Cited

U.S. PATENT DOCUMENTS

| | | | |
|---|---|---|---|
| 3,675,342 | 7/1972 | Wolff | 35/10 |
| 3,675,343 | 7/1972 | Swiatosz et al. | 35/10 |
| 4,001,949 | 1/1977 | Francis | 35/10 |

OTHER PUBLICATIONS

Technical Report: NAVTRAEQUIPCEN, IH-241; "Feasability Demonstration of a Non-Pollutant Synthetic Fire Fighting Trainer" by Swiatosz et al., Dec. 1974.

Primary Examiner—Anton O. Oechsle
Attorney, Agent, or Firm—Richard S. Sciascia; Robert W. Adams

[57] ABSTRACT

Apparatus that imitates the appearance of a commercial deep fat fryer and simulates grease fires. A first burner extends into the bin of the fryer which would be occupied by cooking oil in the operational fryer, and a second burner occupies an area under the hood near the exhaust vent. Also included, out of sight, are a switch controlled by the lid on the bin, an extinguishment sensor in the bin, and a thermostat, which act together to disable the burners and deactivate the simulator when proper fire fighting procedures have been employed by the trainee.

13 Claims, 1 Drawing Figure

U.S. Patent
Nov. 10, 1981
4,299,579
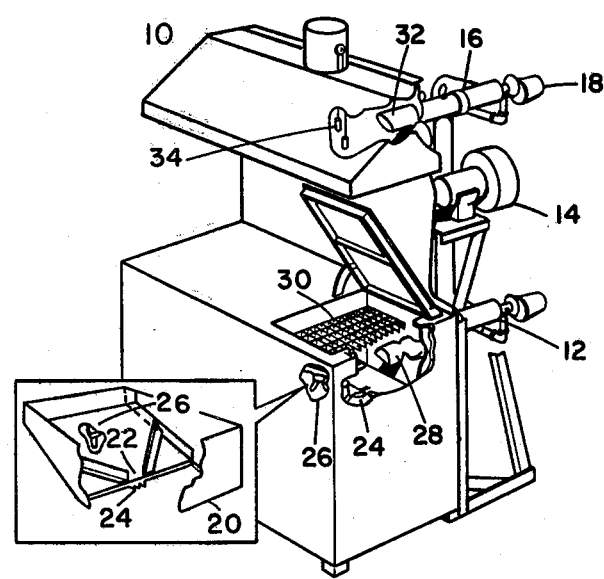

DEEP FAT FRYER FIRE FIGHTING SIMULATOR AND METHOD

BACKGROUND OF THE INVENTION

The present invention relates to the field of trainers. More specifically, the present invention relates to the training of firefighters in the proper techniques for combatting fires in deep fat fryers.

The invention disclosed is an apparatus, a simulator that requires the same conduct from the firefighter as does a fire in an operational fryer. The techniques employed to combat the controlled fire generated by the present invention are the same as those recommended by the experts to combat a fire in a deep fat fryer. And, therein is a primary advantage of the present invention over the prior art.

Previously, cooking oil fires were not simulated. Uncontrolled fires in operational equipment were the primary training ground for firefighters. And, most often these were encountered not in training at all, but in response to an emergency. Where training was attempted under controlled settings, the fire itself was uncontrolled and, as far as known, was fueled with gasoline or kerosene. The chosen setting was sprinkled with fuel and ignited. The fire continued until either the fuel was consumed or successful firefighting techniques were applied. The flame did not respond realistically, however. It was a gas fire, not a cooking oil fire, and nothing was done to try to achieve realistic simulation. Techniques that are successful against a gasoline fire were equally successful against the training fires. Accordingly, until now the firefighter who lacks experience in fighting cooking oil fires in operational deep fat fryers has been ill prepared to successfully respond to such encounters.

Therefore, it is an objective of the present invention to provide a controlled emergency environment that responds realistically to techniques applied by firefighters against cooking oil fires in deep fat fryers. Further, the appearance of both the fire and the apparatus are to be realistic in order to acquaint the trainee, as nearly as possible in a simulated environment, with the factors that will be, or are likely to be, encountered in combatting a fire in a deep fat fryer.

The trainee will be guided by the results he obtains and the instruction he receives to the techniques that are most successful—to the optimum firefighting procedure for the type of fire that he has encountered. Just as cooking oil fires are dynamic, the present invention reacts dynamically to optimize the training experience and leave the trainee who has learned his lessons with a sense of confidence.

An advantage of the present invention is that it is a potentially non-pollutant device. It has essentially no particulates and few gaseous products, compared to other smoke abatement systems which include water spray and/or after burner systems. In addition, it is fully adjustable and immediately responsive, and thoroughly safe. It has the extra capability of being interrupted on command, and then resuming the simulation after detailed corrective instruction or adaptive training has been completed. Monitoring of the trainee's performance from a remote location is also contemplated as an optional feature of the invention.

The present application is a companion case to U.S. patent application Ser. No. 086,977, entitled Fire Fighting Simulator, and U.S. patent application Ser. No. 086,859, entitled Electrical Fire Fighting Simulator, which have all been filed concurrently.

BRIEF DESCRIPTION OF THE DRAWING

The FIGURE is a perspective view, partially in cutaway form, showing an embodiment of the present invention.

DESCRIPTION OF A PREFERRED EMBODIMENT

The FIGURE shows an embodiment of the present invention which is made of fire resistant material. Heavy gauge steel is a representative material from which the structural elements of the invention can be made.

Simulator 10 is designed to imitate a commercial deep fat fryer. It includes a cabinet, lower gas fired burner 12, air blower 14, and upper gas fired burner 16. Each of the burners includes flame sensor 18.

The cabinet is a boxed structure that includes a well which corresponds to the well that holds cooking oil in an operational deep fat fryer. Grill 30 corresponds to the cooking platform that occupies the well in operational deep fat fryers. Also within the well is tray 20 having channel member 22. Tray 20 catches a portion of the fire extinguishing agent that is directed to, or falls into, the well. The base panel of tray 20 is sloped to direct the agent into channel 22. The spout of channel 22 drops the agent onto sensor 24.

Sensor 24 is a device that is chosen to be responsive to the extinguishment agent used. For cooking oil fires, the agent PKP is recommended. PKP is a potassium carbonate powder of fine texture that flows easily. A fine water spray can be added to cool the cabinet and form a slurry. The procedures for applying the agent to such fires will be described below in conjunction with the operation of the simulator.

Sensor 24 may be any of a variety of commercially available sensors that are triggered by a determinable quantity of water, or it may be a specially designed sensor instrument. The sensor should be selected to provide a reliable detection of the quantity of spray deposited over the fire extinguishing area for a given period of time.

When the minimum threshold of spray required to trigger probe 24 is exceeded, a control unit, not shown, is electrically notified. The unit can be as simple as a gate set or as complex as a programmed computer which clocks for recycling and flashback capability. The requirements are that the unit must be responsive to at least two sensors, probe 24, and the switch triggered by operating the lid that covers the well.

As an alternative, the responsibility to detect the quantity of retardant that is properly applied in a predetermined period of time can be transferred from sensor 24 to the control unit. In such a case probe 24 is simplified. Further, a rudimentary system can be constructed that does not concern itself at all with the duration of flooding, or quantity of retardant, but is interested only in detecting that retardant has been directed into the well and that the lid has been closed thereafter, as will be discussed below.

The control unit may employ the teachings that are available in the prior art related to fire fighting trainers. For example, the techniques explored by H. Wolff in U.S. Pat. No. 3,675,342 entitled Fire Fighting Trainer, and by E. Swiatosz and W. Chambers in U.S. Pat. No.

3,675,343 entitled Fire Fighting and Control Simulator, provide a background from which a control unit can be adapted in accordance with the needs of the present invention as it is employed in its various embodiments, chosen to meet specific applications encountered by the user.

The hood structure is a cowling mounted on a wall unit that rises from the rear of the base cabinet. The wall unit may form the rear panel of the cabinet, or the cabinet back may be left open, as desired, with the wall unit being attached to the cabinet near its top. The entire structure is supported by a stand attached to the rear of the structure. It is constructed in accordance with good and standard structural techniques and is needed to withstand repeated bombardment from high pressure hoses having a major vector in the horizontal direction.

The hood member is in covering relationship above the top surface of the base cabinet. It is also made of fire resistant materials to withstand flames from the pit below, and also to withstand flames from nozzle 32 of burner 16, when burner 16 is employed. Burner 16 is an optional device that adds the capability of simulating a secondary fire in the hood when it is used, but it is not required to be included with lower burner 12. When it is included, it also provides the opportunity to be used alone, to simulate a fire that exists only in the hood and vent. Preferably, both burners are included in the simulator and are operated by the control unit in conjunction with each other.

The hood includes an aperture occupied by a vent pipe having manually operable damper control 34 which corresponds to the damper on operational fryers. It, too, is optional with burner 16 but is recommended as an additional tool to be operated in its proper sequence to train the fire fighter in the best procedures.

Burners 12 and 16 were specifically designed by the inventors for fire fighting trainers, and are uniquely small, controllable and reliable. They are thoroughly described in the above-identified U.S. patent application Ser. No. 086,977, entitled Fire Fighting Simulator. That description is incorporated herein by reference.

Propane gas is a recommended fuel for burners 12 and 16. The fuel is provided by plumbing from a separate source that is not shown. As a safety measure and for control purposes, the gas supply should be routinely valved using commonly accepted standards from the propane and gas burner arts. Blower 14 provides forced air to burners 12 and 16 to generate the violent and explosive flame associated with grease and cooking oil fires.

Dual valves in the supply channel are contemplated. In the channel to burner 12, the first valve is responsive to flame sensor 18 attached to burner 12. It is a safety device that turns the supply of gas "off" if the pilot light of burner 12 goes out. Its purpose is to assure that gas does not escape into the training facility through the burner unless a flame is present within the burner to consume it.

Sensor 18 can be a Honeywell "Mini Peeper," an ultraviolet (UV) sensitive device. It is known that the type of flame which results from burning propane gas and many other if not all fuels, is a generator of UV radiation. So, the use of UV sensors accomplishes the desired result of automatically detecting the presence or absence of the flames.

The desired result can also be obtained with a flame rod, strategically placed in the flame. The burner described in the accompanying application that is referenced above was designed for a sensor that views the flame, however, although it could be adapted for other types of sensors. Accordingly, the referenced burner is suitable, as disclosed, for the UV sensor, or possibly an infrared sensor.

Infrared sensors can be experimented with to determine their appropriateness for a desired application. Infrared sensors have been found to be unsatisfactory in most instances, however, because they often respond to the heated metal in the burner after the flame has been removed.

The second valve in the channel to burner 12 is responsive to probe sensor 24 and to the lid switch, and to thermostat 26 for final and complete shutdown. Sensor 24, the lid switch, and thermostat 26 are all coupled to the above-described control unit. The output of the control unit operates a solenoid within the second valve.

The control unit is arranged and organized to deactivate the gas supply when sensor 24 provides the output signifying that the designed-for retardant agent(s) have been doused on the flame and poured across the probes, and when the lid switch also signifies that the lid has been closed. Both operations must have been completed and detected before the second valve is closed. This may be determined by an AND gate in the control unit, coupled to both sensor 24 and the lid switch.

Sensor 24, or the control unit, should include a relay that maintains the signal denoting positive contact with the retardant for a few moments to allow the lid to be lowered, thereby permitting the sensor output and the switch triggering to occur concurrently. The control unit responds to the simultaneous operation to close the valve.

The valve may be reopened, however, to simulate "flashback" if the lid is reopened before the cabinet is cooled. The valve is disabled by the control unit only so long as both the lid switch and the signal from sensor 24 are active. If either changes, the control unit reverses the solenoid and the valve reopens. And, burner 12 is automatically reignited, simulating "flashback."

Thermostat 26 is included within the well under the base panel of the tray to provide the control unit a sensor that responds to the temperature in the well. Thermostat 26 has an electrical output coupled to the valve. The valve includes a second gating means responsive to concurrent triggers from said lid switch and said thermostat that said lid is in a closed position on said well and the temperature sensed by said thermostat is below a preselected threshold value, for maintaining said valve closed in response to said concurrent triggers at both said inputs to said first gating means in a closed condition preventing fuel to pass therethrough in response to said concurrent triggers from said switch and said thermostat. In operational equipment, flashback does not occur if the fryer has been cooled down. Thermostat 26 is preset to notify the control unit when the temperature in and around the well has been reduced to a level that has been determined to be safe. Burner 12 remains "off" and the cooking oil fire in the well remains extinguished.

Upper burner 16 is also controlled by a control unit that is responsive to sensor(s). A first valve in the gas supply line to burner 16 responds to flame sensor 18. Sensor 18 is discussed above. The second valve is responsive to a switch operated by vent control 34, if a second valve and vent control are included in the simulator. The second valve could be made responsive to a second flame sensor positioned near the mouth of burner 16, as in the above-identified accompanying U.S. patent application Ser. No. 086,859.

The control unit for upper burner 16 can be separate from the control unit for lower burner 12, although in most users will find it more convenient to assemble the circuitry as a unit. As an additional advantage of combining the control operations, greater latitude is available in sequencing and interaction, and in programming if the control unit is a programmable device.

The intended training sequence on the simulator and its operation will now be described to provide the reader with an understanding of the objectives of the device and its components. Other sequences are available, as desired, although the one described below has been found to be most advantageous. All are to be considered as being within the teaching of the present invention.

The lid covering the cooking well is raised and an instructor ignites burner 12 and/or burner 16. The trainee approaches and beats down the flame from burner 12 with an extinguishing agent such as PKP. Sensor 24 will detect properly directed agent that falls into trough 22 and initiate a disablement trigger to the control unit. The trainee must then close the lid to extinguish the blaze. The lid switch is closed, which permits the control unit to order a solenoid to close the valve in the gas supply line.

If the trainee fails to close the lid, or fails to do so within the prescribed period of time, the fire will continue and re-engulf the cooking well when the extinguishing agent is removed. If the lid is closed, but reopened before the cabinet cools down, the lid switch reopens and gas is resupplied, and "flashback" occurs to reignite the blaze.

Similarly, the hood and vent fire simulated by burner 16 is dealt with by the trainee. An agent such as PKP is directed into the blaze to beat down the flames. If a manual switch such as vent control 34 is to be operated, it must then be tripped to permit the control unit to activate the solenoid that closes the valve in the gas line to burner 16. If a flame sensor is used, the proper application of the extinguishing agent will remove the flames and cause the sensor to trigger the control unit.

Accordingly, the next step for the trainee to take after he has closed the lid (and extinguished the hood fire where one is present) is to spray the cabinet with water. The water bath will cool the cabinet and activate the thermostat, which will enable the control unit to maintain burner 12 "off."

Based upon the above description and operation, the control unit and relays could be assembled from available components and conventional engineering skill. Operable embodiments of the invention could be practiced with as simple a circuit as a gating arrangement or as complex a system as a programmed computer. It is expected that the user will find sufficient advantages in most of the options described above to incorporate circuitry specifically designed for the intended purpose.

Obviously, many modifications and variations of the present invention are possible in light of the above teachings. It is, therefore, to be understood that within the scope of the appended claims the invention may be practiced otherwise than as specifically described.

What is claimed is:

1. An apparatus for imitating the appearance of a commercial deep fat fryer and simulating cooking oil fires therein, comprising:

a metal structure having a base member and a hood member elevated thereover, with a vertical wall member joining said hood member to said base member and a supporting stand attached to said structure, wherein said base member includes a cavity well with moveable lid which corresponds in general appearance to the cooking vat of an operational deep fat fryer;

an aperture in a side wall of said well communicating said well to the outside of a first side of said base member;

burner means mounted in alignment with said aperture and substantially outside said well for controllably providing flame into said well;

signalling means within said well for sensing a preselected fire extinguishing agent and changing states in response to the presence of the agent;

an electrical switch associated with said lid that provides outputs definitive of the position of said lid with respect to its covering relationship over said well; and valving means responsive to said electrical switch and said signalling means for disabling said burner means by discontinuing its supply of fuel when indicators from said switch and said signalling means are simultaneously in preselected modes that correspond to said lid being closed on said well and said signalling means being in the state that relates to the presence of said agent, respectively.

2. The apparatus of claim 1, wherein said burner means includes a burner, and an air blower coupled to said burner for supplying forced air to said burner.

3. The apparatus of claim 2, wherein said wall member is also said first side of said base member, such that said wall member forms the back wall of said structure, and said blower, said supporting stand, and substantially all of said burner are on the same side of said wall member.

4. The apparatus of claim 3, wherein said lid is hinged on the upper surface of said base cabinet adjacent said side wall of said well such that said lid is hinged adjacent said back wall and opens from the front of said structure, and said well includes a grid that is between said lid and said signalling means.

5. The apparatus of claim 4, wherein said hood member is a cowl that is in covering relationship and spaced above the top surface of said base member, and includes an aperture occupied by a vent pipe that has a manually controllable member therein which adjustably restricts the flow of air therethrough.

6. The apparatus of claim 1, wherein said burner means is a propane burner that is of a tubular shape having a nozzle on a first end which extends into said well, and a flame sensor on the opposite end, with a gas receiving port on the side of said tubular shaped burner near the end occupied by said flame sensor and an air receiving port between said gas receiving port and said nozzle.

7. The apparatus of claim 6, wherein said structure includes a tray member within said well having a spout and a bottom panel sloped downward toward said spout for directing said extinguishing agent that drops into said tray out said spout, and wherein said signalling means has a probe sensor with its probe mounted in alignment with the discharge from said spout such that said agent is directed onto said probe.

8. The apparatus of claim 7, wherein said signalling means includes a relay for retaining the state of said signalling means that corresponds to the presence of said agent for a preselected period of time, said valving means includes a solenoid controlled valve and an AND gating means having a first input terminal coupled to said relay and a second input terminal coupled to said electrical switch and an output terminal coupled to said solenoid for operating said valve in response to concurrent triggers at both said inputs to said gating means.

9. The apparatus of claim 8, wherein said apparatus includes a thermostat within said well under said sloped panel having an electrical output coupled to said valving means and said valving means includes a second gating means responsive to concurrent triggers from said lid switch and said thermostat that said lid is in a closed position on said well and the temperature sensed by said thermostat is below a preselected threshold value, for maintaining said valve closed in response to said concurrent triggers at both said inputs to said first gating means in a closed condition preventing fuel to pass therethrough in response to said concurrent triggers from said switch and said thermostat.

10. The apparatus of claim 9, wherein said hood includes an aperture through its rear wall communicating the cowled area to the back side of said structure and said apparatus includes a second burner mounted in alignment with said hood aperture with the nozzle of said second burner passing through said aperture into said cowled area to simulate hood fire and flareup.

11. The apparatus of claim 1 further comprising a temperature sensitive device within said base member that operates to maintain said valving means closed to ensure that said fuel supply remains discontinued when the temperature at said device is below a preselected threshold value.

12. A method of training firefighter trainees during a training session in the techniques best suited to combat a cooking oil fire occurring in a deep fat fryer, comprising the steps of:

providing a structure having substantially the appearance of a deep fat fryer, including a movable lid in covering relationship to a cooking well;
providing means for generating a controlled flame within said well;
sensing the application of fire retardant material applied by said trainee properly, as determined by preselected parameters, into said well;
discontinuing said controlled flame when said fire retardant material is properly applied and said lid is placed in covering relationship to close said well within a predetermined period of time after said proper application of material;
re-establishing said controlled flame when said lid is removed from closure of said well before said well has cooled to a preselected temperature; and
ending said training session when said controlled flame has been discontinued and the temperature of said well is at or below said preselected temperature.

13. Apparatus imitating the appearance of a deep fat fryer, for providing training in techniques to effectively combat cooking oil fires, comprising:
fire-resistant structure having a simulated cooking vat with movable lid, and a lid switch which provides an output representative of the position of said lid with respect to its covering relationship as a closure to said vat;
burner means for providing controlled flame in said vat;
signalling means within said vat for providing an output in response to the proper application, as determined by preselected criteria, of preselected fire extinguishing agent(s);
valving means responsive to said lid switch and said signalling means for disabling said burner means when said output from said lid switch, and said output from said signalling means, are representative that said agent(s) have been applied properly, and that said lid has been placed in a closure position to said vat within a predetermined period of time of the last proper application of said agent(s).

* * * * *